United States Patent
Gokul et al.

(10) Patent No.: US 11,494,007 B1
(45) Date of Patent: Nov. 8, 2022

(54) ADAPTIVE STYLUS FRONTEND TO IDENTIFY AND UPDATE ZERO FORCE OFFSET PRESSURE IN AN ACTIVE STYLUS

(71) Applicant: CIREL SYSTEMS PRIVATE LIMITED, Karnataka (IN)

(72) Inventors: Navaneeth Bhardwaj Gokul, Bangalore (IN); Vikas Suresh Agarwal, Bangalore (IN)

(73) Assignee: CIREL SYSTEMS PRIVATE LIMITED, Bangalore (IN)

( * ) Notice: Subject to any disclaimer, the term of this patent is extended or adjusted under 35 U.S.C. 154(b) by 0 days.

(21) Appl. No.: 17/463,492

(22) Filed: Aug. 31, 2021

(30) Foreign Application Priority Data

Jul. 5, 2021 (IN) .............................. 202141030119

(51) Int. Cl.
*G06F 3/038* (2013.01)
*G06F 3/0354* (2013.01)
*G06F 3/041* (2006.01)

(52) U.S. Cl.
CPC ........ *G06F 3/0383* (2013.01); *G06F 3/03545* (2013.01); *G06F 3/0418* (2013.01); *G06F 3/04162* (2019.05); *G06F 3/04182* (2019.05)

(58) Field of Classification Search
CPC .... G06F 3/0383; G06F 3/038; G06F 3/03545; G06F 3/0416; G06F 3/04162; G06F 3/0418; G06F 3/04182; G06F 2203/04105; G06F 2203/04108
See application file for complete search history.

(56) References Cited

U.S. PATENT DOCUMENTS

| | | | | |
|---|---|---|---|---|
| 8,493,360 | B2* | 7/2013 | Kremin | G06F 3/03545 345/174 |
| 2003/0214490 | A1* | 11/2003 | Cool | G06F 3/03545 345/179 |
| 2008/0167832 | A1* | 7/2008 | Soss | G06F 3/04144 702/104 |
| 2010/0164898 | A1* | 7/2010 | Vu | G06F 1/3262 345/173 |
| 2014/0160088 | A1* | 6/2014 | Mercea | G06F 1/3262 345/179 |
| 2017/0153763 | A1* | 6/2017 | Vavra | G06F 3/0442 |
| 2017/0255281 | A1* | 9/2017 | Gordon | G06F 3/03545 |
| 2018/0341359 | A1* | 11/2018 | Khajeh | G06F 1/1656 |
| 2022/0147161 | A1* | 5/2022 | Jung | G06F 3/038 |

* cited by examiner

*Primary Examiner* — Darlene M Ritchie
(74) *Attorney, Agent, or Firm* — Maschoff Brennan

(57) ABSTRACT

Disclosed is an adaptive stylus frontend to identify and update zero force offset pressure codes. The adaptive stylus frontend comprises a high gain instrumentation amplifier configured to receive the analog signal and provide the required gain to the analog signal. The adaptive stylus frontend comprises an analog-to-digital converter configured to convert the analog signal to digital codes at a predetermined sampling frequency. The stylus comprises an adaptive offset controller configured to adaptively identify, and update zero force offset pressure codes, wherein the zero force offset pressure code is the ADC output value when no external force is applied at the stylus tip. The zero force offset pressure comprises the pressure sensor offset introduced by a pressure sensor, the amplifier offset introduced by the amplifier, and the offset introduced by the analog to digital converter.

9 Claims, 5 Drawing Sheets

ADAPTIVE STYLUS FRONTEND TO IDENTIFY AND UPDATE ZERO FORCE OFFSET PRESSURE IN AN ACTIVE STYLUS

FIELD OF THE INVENTION

The present disclosure generally relates to an active stylus as opposed to a passive stylus, and more particularly relates to an active stylus to adaptively identify and update zero force offset pressure.

BACKGROUND OF THE INVENTION

In computing, stylus is a pen shaped input device that can be used to write, draw pictures or to select objects on a touchscreen panel. Typically, when the stylus is in use, there is a pressure sensor which senses the force applied by the user at the writing tip of the stylus. The sensed pressure is further amplified to get a required gain. Under ideal conditions, when no force is applied at the writing tip of the stylus, the output of the force sensing element and the amplifier output are expected to have a zero value. However, in the real world, there exists an offset voltage even when the stylus is not in use. This offset voltage is called the zero force offset pressure and it comprises the pressure sensor offset introduced by the pressure sensor, the amplifier offset introduced by the amplifier, and the offset introduced by the analog to digital converter.

In one existing technology, the stylus detects a condition of touch down on the touchscreen or hover by comparing the sensor output against a programmable threshold. However, the sensor output in hover/zero applied force may change due to ageing, temperature changes and/or other external factors. In another existing technology, the stylus includes a mechanism to preload the stylus tip with a specific minimum pressure in order to prevent wobbling of the tip and hence provide a better user experience. Thus, there is a mechanical offset that is engineered into the stylus tip which is subject to change over time due to wear and tear of the mechanical components used. In cases where the stylus tip is preloaded, it becomes necessary to adaptively track the changes happening on the sensor output when its tip is not in physical contact with a touch screen and update the threshold at which the stylus detects the Inking State so as to ensure consistent user writing experience.

There is an unmet need to adaptively identify and update the zero force offset pressure, for ensuring seamless writing experience with the stylus.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The present disclosure implements an adaptive stylus frontend to identify and update zero force offset pressure codes in an active stylus. The adaptive stylus frontend comprises a high gain instrumentation amplifier configured to receive the analog signal and provide the required gain to the analog signal. The adaptive stylus frontend comprises an analog-to-digital converter (ADC) configured to convert the analog signal to digital codes at a predetermined sampling frequency. The adaptive stylus frontend comprises an adaptive offset controller configured to adaptively identify, and update zero force offset pressure codes, wherein the zero force offset pressure code is the ADC output value when no external force is applied at the stylus tip.

It is another objective of the present disclosure to implement a method to adaptively identify and update zero force offset pressure codes in an active stylus. The method comprises converting analog signals at output of a pressure sensor to digital codes, wherein the analog signals correspond to force applied by a user at stylus tip. The method comprises determining a hover state by the stylus, wherein determining the hover state comprises calculating a first mean and a first standard deviation of the digital codes, comparing the standard deviation to a predetermined standard deviation threshold value and if the first standard deviation is less than the predetermined standard deviation threshold value, setting first mean value as hover_to_tip threshold value, and comparing the digital codes to the hover_to_tip threshold value. Further the method includes determining an inking state by the stylus, wherein determining the inking state comprises entering the inking state if value of the digital codes is greater than the hover_to_tip threshold value, calculating a second mean and a second standard deviation if the digital codes is greater than a tip_to_hover threshold value, comparing the second standard deviation to a second predetermined standard deviation threshold value and starting a timer if the standard deviation is less than the second predetermined standard deviation threshold value. The method comprises resetting the timer if the second standard deviation value is greater than the second predetermined standard deviation threshold value and continue to be in inking state. Further, the method includes transitioning to hover state when the digital code is less than tip_to_hover threshold value or on expiry of the timer.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which.

Figure 1A:
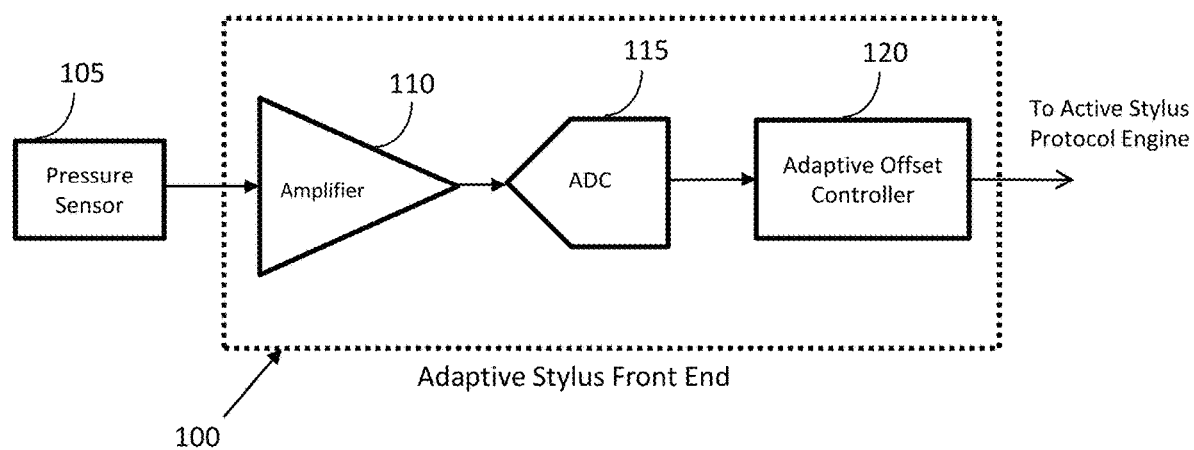
FIG. 1A illustrates an adaptive stylus frontend to identify pressure applied on the stylus tip and update zero force offset pressure codes in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction, the stylus and one or more components of it may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Typically, a stylus has a force sensing element to sense the pressure applied at the stylus tip. The force sensing element is followed by an instrumentation amplifier to amplify the sensed signal and an analog to digital converter (ADC) to convert the analog signal to digital codes. Under ideal conditions, when no force is applied at the writing tip of the stylus, the output of the force sensing element, the amplifier output and the ADC output are expected to have a zero value. However, in the real world, there exists an offset voltage even when the stylus is not in use. This offset voltage is called the zero force offset pressure and it comprises the pressure sensor offset introduced by the pressure sensor, the amplifier offset introduced by the amplifier and the zero input offset code introduced by the ADC. Embodiments of the present disclosure relates to an adaptive stylus frontend to identify and update zero force offset pressure codes.

Referring to FIG. 1A, FIG. 1A illustrates an adaptive stylus frontend 100 to identify and update zero force offset pressure codes in accordance with an embodiment of the present disclosure. The stylus frontend 100 includes an instrumentation amplifier 110, an Analog to digital converter (ADC) 115, and an adaptive offset controller 120. The stylus frontend 100 is coupled to a pressure sensor 105. The pressure sensor 105, is preceded by the writing tip or stylus tip (not shown in FIG. 1A).

The pressure sensor 105 senses the force applied by a user at the stylus tip. The pressure sensor 105 then converts the physical force exerted on the stylus tip into an analog signal. The pressure sensor 105 is followed by the instrumentation amplifier 110. The instrumentation amplifier 110 is a high gain amplifier and is configured to receive the analog signal and provide the required gain to the analog signal. The zero force offset pressure described herein, also referred to as 0 g offset, comprises the pressure sensor offset introduced by the pressure sensor 105, the amplifier offset introduced by the instrumentation amplifier 110, and the zero input offset code of the analog to digital converter 115.

The instrumentation amplifier 110 is followed by the ADC 115. The ADC 115 is configured to convert the analog signal to digital codes at a predetermined sampling frequency. The output of the ADC 115 would be in the range of 0 to $2^n$ where n is the ADC resolution. When there is no external pressure applied at the stylus tip this output will be the sensor offset+amplifier offset+zero input offset code of the ADC which would be an absolute value >0 and is collectively called as the 0 g offset. When the stylus is being used by the user to write/draw, the pressure sensor will experience a varying pressure as per the usage. When the stylus is in use, the ADC output would be presenting some excitations over and above the 0 g offset mentioned.

The adaptive offset controller 120 is configured to adaptively identify and update zero force offset pressure codes. The adaptive offset controller 120 implements a control logic which can identify and adaptively update the Hover State to Inking State threshold during runtime without affecting the performance of the stylus. Hover state is defined as a state at which no pressure is sensed from the stylus tip. Inking state is defined as a state at which stylus is operational by way of writing or drawing by a user, thereby causing pressure to be applied on the stylus tip. The stylus frontend 100 is initially in hover state. The adaptive offset controller 120 determines a hover state by first calculating a first mean and a first standard deviation of the digital codes. Further the adaptive offset controller 120 compares the first standard deviation to a predetermined standard deviation threshold value that is determined based on the noise tolerance of the stylus through tests, and if the first standard deviation is less than the predetermined standard deviation threshold value, the adaptive offset controller 120 sets the first mean value as hover_to_tip threshold value. Further, the adaptive offset controller 120 compares the digital codes to the hover_to_tip threshold value. The adaptive offset controller 120 enables the stylus frontend 100 to enter the inking state if value of the digital codes is greater than the hover_to_tip threshold value. Further, the adaptive offset controller 120 calculates a second mean and a second standard deviation if the digital codes are greater than a tip_to_hover threshold value. Then, the second standard deviation is compared to a second predetermined standard deviation threshold value and a timer is started if the second standard deviation is less than the second predetermined standard deviation threshold value. The timer is reset if the second standard deviation value is greater than the second predetermined standard deviation threshold value and continue to be in Inking State. The stylus frontend 100 transitions to hover state when the digital code is less than tip_to_hover threshold value or on expiry of the timer. The adaptive identification and updating of the zero force offset pressure codes enable the stylus to track the changes in the zero force offset pressure with time, temperature, or any other physical factors, and allows the stylus to instantaneously transition between a hover state and an inking state accurately. The adaptive offset controller 120 is further explained in conjunction with FIG. 1B.

Figure 1B:
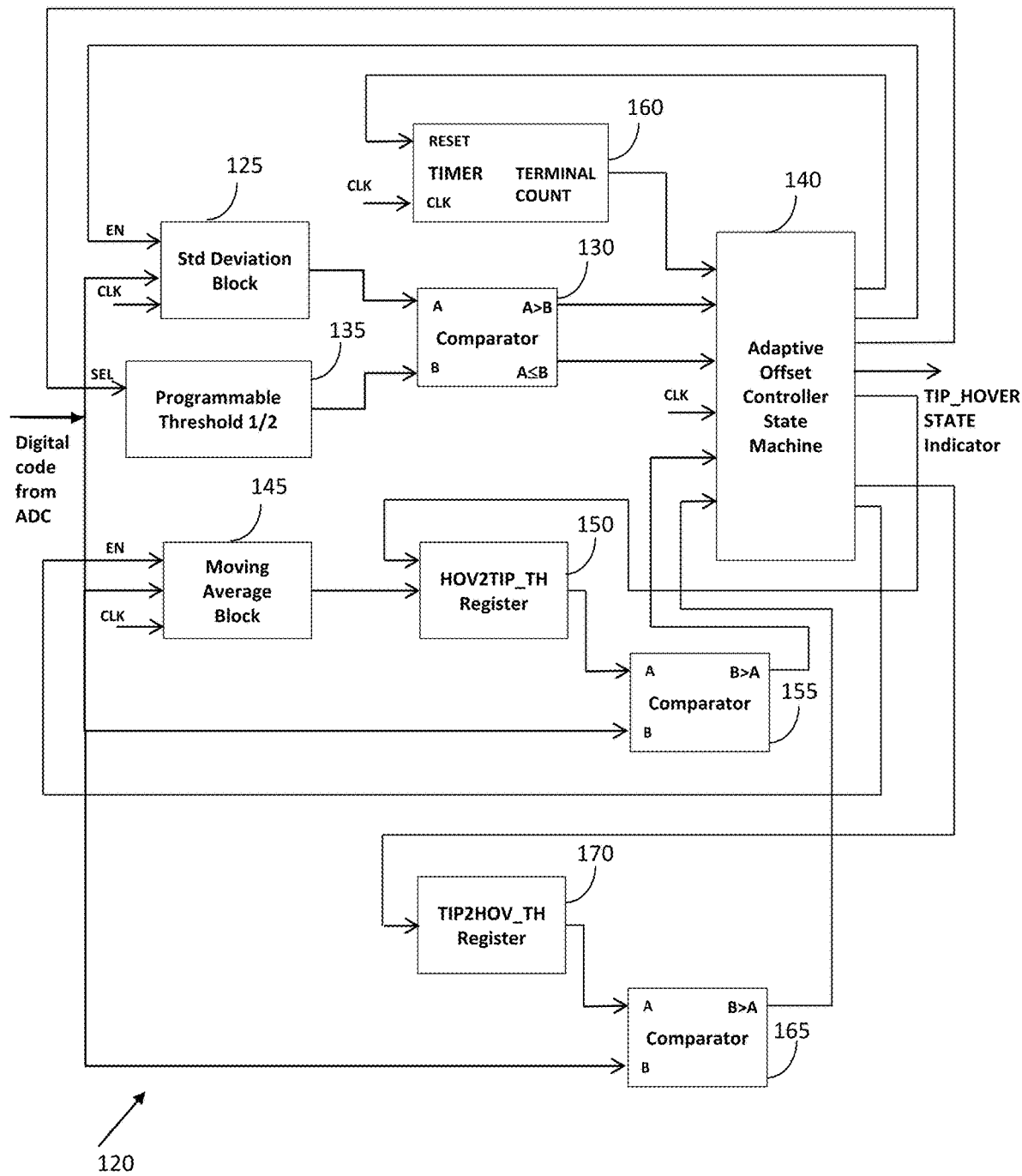
FIG. 1B illustrates a block diagram of an adaptive offset controller in accordance with an embodiment of the present disclosure.

Referring to FIG. 1B, a moving average block 145 calculates a first mean value and a standard deviation block 125 calculates a first standard deviation of the incoming digital code from the ADC 115. A comparator 130 compares the standard deviation derived as output from the standard deviation block 125 to a first predetermined standard deviation threshold value that is determined based on the noise tolerance of the stylus through tests. The first predetermined standard deviation threshold value is programmable, depicted as block 135. If the first standard deviation is less than the first predetermined standard deviation threshold value, the adaptive offset controller state machine 140 sets the first mean value as hover_to_tip threshold value by way of HOV2TIP threshold register 150. Further, the adaptive offset controller state machine 140 compares the digital codes to the hover_to_tip threshold value by way of HOV2TIP_TH register 150 and comparator 155. The adaptive offset controller state machine 140 enables the stylus to enter the inking state if value of the digital codes is greater than the hover_to_tip threshold value. Further, the adaptive offset controller state machine 140 enables the calculation of a second mean and a second standard deviation if the digital codes is greater than a tip_to_hover threshold value by way of TIP2HOV threshold register 170 and comparator 165. Then, the second standard deviation is compared to a second predetermined standard deviation threshold value by way of selection in Programmable Threshold 1/2 135 and a timer 160 is started if the second standard deviation is less than the second predetermined standard deviation threshold value. The timer 160 is reset if the second standard deviation value is greater than the second predetermined standard deviation threshold value so that the stylus continues to be in Inking State. The stylus transitions to hover state when the digital code is less than tip_to_hover threshold value or on expiry of the timer 160.

In one embodiment, the adaptive stylus frontend 100 can be implemented as part of a standalone integrated stylus chip (IC). In another embodiment, the adaptive stylus frontend 100 can be implemented as an integrated chip, having other components within the active stylus, for example, the frontend can be integrated with the pressure sensor 105 in an IC.

Figure 2:
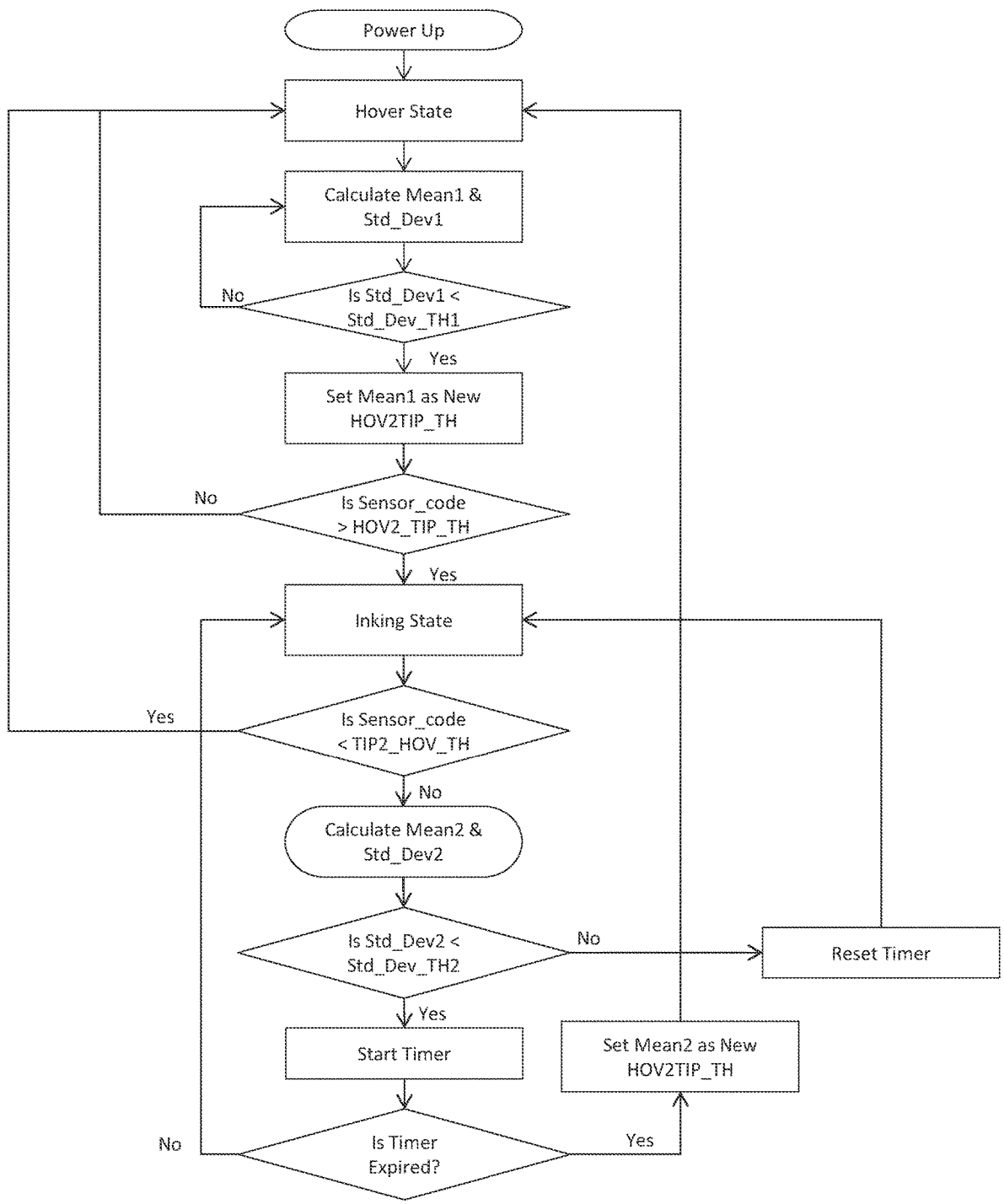
FIG. 2 illustrates a flowchart to adaptively identify, and update zero force offset pressure codes in accordance with an embodiment of the present disclosure.

FIG. 2 illustrates a flowchart to adaptively identify and update zero force offset pressure codes in accordance with an embodiment of the present disclosure. The flowchart discusses a method to distinguish between the Hover State and the Inking State and track the changes in 0 g offset with time, temperature, or any other physical factors. To detect the condition of "no excitation" on the stylus tip a method of computing standard deviation of the ADC samples is used. At power up, the stylus is assumed to have no external pressure at its tip. The method includes computing the standard deviation (sigma) over the last N pressure samples. If the computed sigma is less than the programmed threshold then the mean of these N samples is set as the new 0 g offset. The stylus remains in an internal state of hover as long as the pressure output is less than this 0 g offset+the initial activation force collectively called as the HOV2TIP threshold. Once the pressure output crosses the HOV2TIP threshold (hover to tip threshold) value, the stylus moves into Inking State and stays there until and unless the digital code is less than TIP2HOV threshold (tip to hover threshold) value. While in the inking state the pressure output from the ADC is expected to see random variations as per the usage by the user. However, the 0 g offset can change due to mechanical fatigue or other factors while the stylus is in the Inking State. To address this dynamic variation of 0 g offset a timer is started upon detecting a "no excitation" condition in pressure output, using the method of standard deviation described earlier. If this "no excitation" condition is sustained for a programmable amount of time, then it is considered as a shift in 0 g offset and its value is updated. If within this time an excitation is experienced, the timer is reset.

Figure 3:
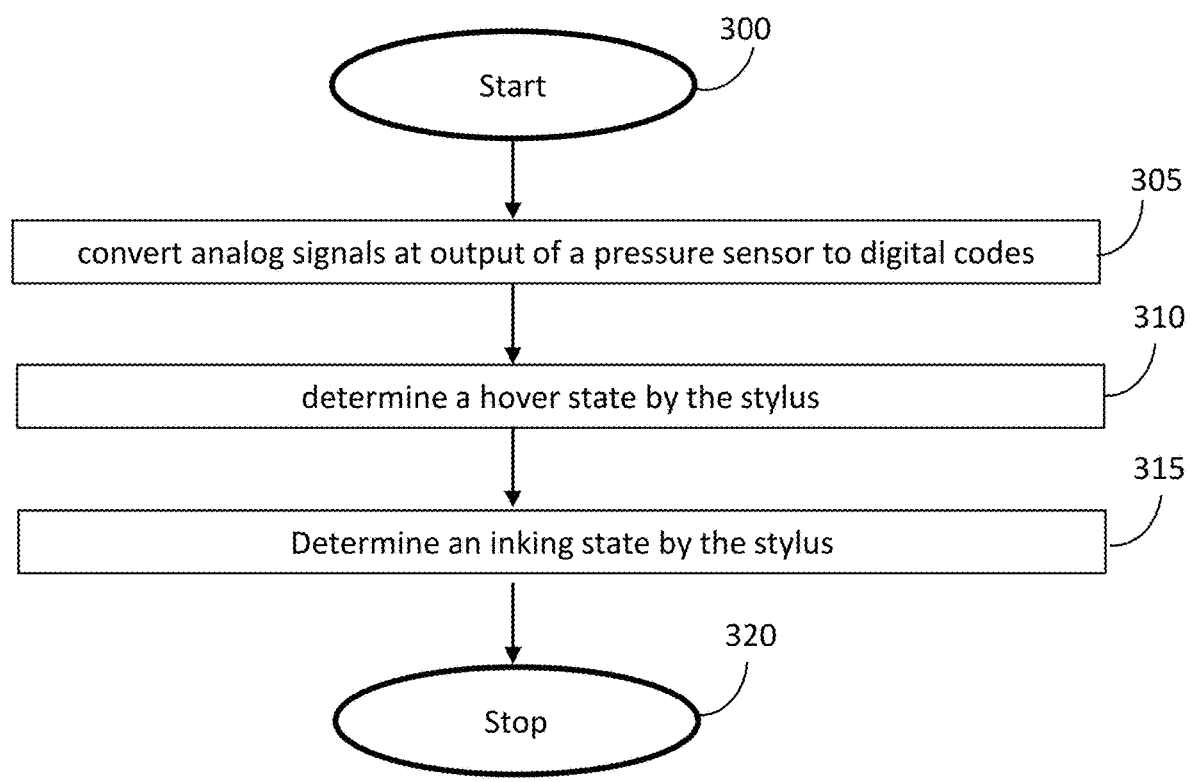
FIG. 3 illustrates a method to adaptively identify, and update zero force offset pressure codes in accordance with an embodiment of the present disclosure.

FIG. 3 illustrates a method to adaptively identify and update zero force offset pressure codes in accordance with an embodiment of the present disclosure.

The method starts at step 300.

Step 305 includes converting analog signals at output of a pressure sensor to digital codes, wherein the analog signals correspond to force applied by a user at stylus tip.

Step 310 includes determining a hover state by the stylus. The step of determining the hover state includes calculating a first mean and a first standard deviation of the digital codes, comparing the standard deviation to a predetermined standard deviation threshold value and if the first standard deviation is less than the predetermined standard deviation threshold value, setting first mean value as hover_to_tip threshold value, and comparing the digital codes to the hover_to_tip threshold value.

Step 315 includes determining an inking state by the stylus. Determining the inking state includes entering the inking state if value of the digital codes is greater than the hover_to_tip threshold value, calculating a second mean and a second standard deviation if the digital codes is greater than a tip_to_hover threshold value, comparing the second standard deviation to a second predetermined standard deviation threshold value, starting a timer if the standard deviation is less than the second predetermined standard deviation threshold value, resetting the timer if the second standard deviation value is greater than the second predetermined standard deviation threshold value and continue to be in inking state, and transitioning to hover state when the digital code is less than tip_to_hover threshold value or on expiry of the timer.

The method includes recalculating the first mean and the first standard deviation if the first standard deviation is greater than the predetermined standard deviation value. Further, the method includes remaining in the hover state if value of the digital codes is less than the hover_to_tip threshold value or remaining in the inking state until when the digital code is less than tip_to_hover threshold value or expiry of the timer.

The method ends at step 320.

Figure 4:
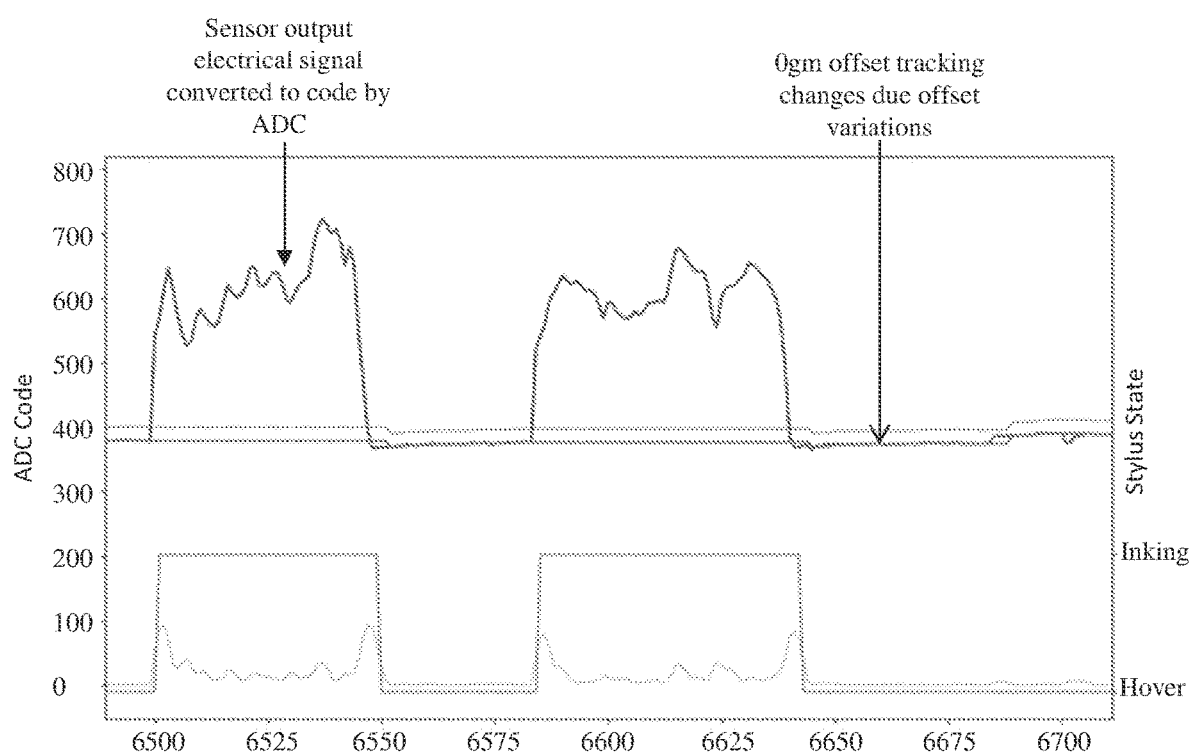
FIG. 4 illustrates a typical temporal waveform diagram in accordance with an embodiment of the present disclosure.

FIG. 4 illustrates a typical temporal waveform diagram in accordance with an embodiment of the present disclosure. In FIG. 4, the change in states from Hover to Inking state and vice versa is depicted in a waveform diagram. From the waveform diagram, it is observed that the stylus is able to track the changes in the zero force offset pressure allowing the stylus to instantaneously transition between a hover state and an inking state accurately.

While specific language has been used to describe the disclosure, any limitations arising on account of the same are not intended. As would be apparent to a person skilled in the art, various working modifications may be made to the method in order to implement the inventive concept as taught herein.

The figures and the description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. An adaptive stylus frontend to identify and update zero force offset pressure codes in an active stylus, the adaptive stylus frontend comprising:
    a pressure sensor to sense force applied by a user at stylus tip and convert sensed force to analog signal;
    a high gain instrumentation amplifier configured to receive the analog signal and provide the required gain to the analog signal;
    an analog-to-digital converter (ADC) configured to convert the analog signal to digital codes at a predetermined sampling frequency; and
    an adaptive offset controller configured to determine a hover state and an inking state,
    wherein the hover state is determined by:
        calculating a first mean and a first standard deviation of the digital codes;
        comparing the first standard deviation to a predetermined standard deviation threshold value that is determined based on the noise tolerance of the stylus through trial tests, and if the first standard deviation is less than the predetermined standard deviation threshold value, setting the first mean value as hover_to_tip threshold value; and
        comparing the digital codes to the hover_to_tip threshold value;
    wherein the inking state is determined by:
        entering the inking state if value of the digital codes is greater than the hover_to_tip threshold value;
        calculating a second mean and a second standard deviation if the digital codes is greater than a tip_to_hover threshold value;
        comparing the second standard deviation to a second predetermined standard deviation threshold value;
        starting a timer if the second standard deviation is less than the second predetermined standard deviation threshold value; and
        resetting the timer if the second standard deviation value is greater than the second predetermined standard deviation threshold value and continue to be in inking state; and
    wherein the controller adaptively identifies, and update zero force offset pressure codes, wherein zero force offset pressure code is the ADC output value when no external force is applied at stylus tip.

2. The adaptive stylus frontend as claimed in claim 1, wherein the adaptive stylus frontend is coupled to a pressure sensor to sense force applied by a user at the stylus tip and convert the sensed force to the analog signal.

3. The adaptive stylus frontend as claimed in claim 1, wherein the zero force offset pressure comprises the pressure sensor offset introduced by a pressure sensor, the amplifier offset introduced by the amplifier, and the offset introduced by the analog to digital converter.

4. The adaptive stylus frontend as claimed in claim 1, wherein the adaptive identification and updating of the zero force offset pressure codes enable the stylus to track the changes in the zero force offset pressure with time, temperature, or any other physical factors, and allows the stylus to instantaneously transition between a hover state and an inking state accurately.

5. The adaptive stylus frontend as claimed in claim 1, wherein the stylus transitions to hover state when the digital code is less than tip_to_hover threshold value or setting second mean value as hover_to_tip threshold value and transitioning to hover state on expiry of the timer.

6. A method to adaptively identify and update zero force offset pressure codes in an active stylus, the method comprising:
    converting analog signals at output of a pressure sensor to digital codes, wherein the analog signals correspond to force applied by a user at stylus tip;
    determining a hover state by the stylus, wherein determining the hover state comprises:
        calculating a first mean and a first standard deviation of the digital codes;
        comparing the standard deviation to a predetermined standard deviation threshold value and if the first standard deviation is less than the predetermined standard deviation threshold value, setting first mean value as hover_to_tip threshold value; and
        comparing the digital codes to the hover_to_tip threshold value; and
    determining an inking state by the stylus, wherein determining the inking state comprises:
        entering the inking state if value of the digital codes is greater than the hover_to_tip threshold value;
        calculating a second mean and a second standard deviation if the digital codes is greater than a tip_to_hover threshold value;
        comparing the second standard deviation to a second predetermined standard deviation threshold value;
        starting a timer if the standard deviation is less than the second predetermined standard deviation threshold value;
        resetting the timer if the second standard deviation value is greater than the second predetermined standard deviation threshold value; and
        transitioning to hover state when the digital code is less than tip_to_hover threshold value or setting second mean value as hover_to_tip threshold value and transitioning to hover state on expiry of the timer.

7. The method as claimed in claim 6, comprising recalculating the first mean and the first standard deviation if the first standard deviation is greater than the predetermined standard deviation value.

8. The method as claimed in claim 6, comprising remaining in the hover state if value of the digital codes are less than the hover_to_tip threshold value.

9. The method as claimed in claim 6, comprising remaining in the inking state until the digital code is less than tip_to_hover threshold value or setting second mean value as hover_to_tip threshold value and transitioning to hover state on expiry of the timer.

\* \* \* \* \*